(12) United States Patent
Zellner

(10) Patent No.: US 10,846,387 B2
(45) Date of Patent: Nov. 24, 2020

(54) MANAGING ACCESS BASED ON ACTIVITIES OF ENTITIES

(71) Applicant: AT&T Intellectual Property I, L.P., Atlanta, GA (US)

(72) Inventor: Samuel N. Zellner, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 192 days.

(21) Appl. No.: 15/647,443

(22) Filed: Jul. 12, 2017

(65) Prior Publication Data

US 2019/0019363 A1    Jan. 17, 2019

(51) Int. Cl.
| | |
|---|---|
| G06F 21/32 | (2013.01) |
| G06F 21/60 | (2013.01) |
| G06F 21/55 | (2013.01) |
| H04L 29/06 | (2006.01) |
| H04W 12/08 | (2009.01) |
| H04W 12/00 | (2009.01) |
| G07C 9/37 | (2020.01) |

(52) U.S. Cl.
CPC .............. G06F 21/32 (2013.01); G06F 21/55 (2013.01); G06F 21/604 (2013.01); H04L 63/102 (2013.01); H04L 63/1416 (2013.01); H04L 63/20 (2013.01); G07C 9/37 (2020.01); H04L 63/0861 (2013.01); H04W 12/00504 (2019.01); H04W 12/00506 (2019.01); H04W 12/00508 (2019.01); H04W 12/08 (2013.01)

(58) Field of Classification Search
None
See application file for complete search history.

(56) References Cited

U.S. PATENT DOCUMENTS

| | | |
|---|---|---|
| 5,543,778 A | 8/1996 | Stouffer |
| 5,987,440 A | 11/1999 | O'Neil et al. |
| 6,047,270 A | 4/2000 | Joao et al. |
| | (Continued) | |

FOREIGN PATENT DOCUMENTS

| | | |
|---|---|---|
| WO | 00/52658 | 9/2000 |
| WO | 02/01531 | 1/2002 |
| WO | 2012009714 | 1/2012 |

OTHER PUBLICATIONS

"Home Automation," Alarm.com, Jun. 6, 2014, https://web.archive.org/web/20140606142722/http://www.alarm.com/productservices/home_automation.aspx.

(Continued)

*Primary Examiner* — Benjamin E Lanier
(74) *Attorney, Agent, or Firm* — Hartman & Citrin LLC

(57) ABSTRACT

Concepts and technologies are disclosed herein for managing access based on activities of entities. A computing device can collect data that comprises an image. The computing device can identify an entity that is located in a range of a sensor. The computing device can determine an identity that is associated with the entity and an activity associated with the entity. The computing device can obtain a trust indicator associated with the entity. The computing device can determine, based on the trust indicator, if the activity should be allowed. If the computing device determines that the activity should be allowed, the computing device can initiate allowing of the activity. If the computing device determines that the activity should not be allowed, the computing device can initiate blocking of the activity.

20 Claims, 6 Drawing Sheets

(56) References Cited

U.S. PATENT DOCUMENTS

| | | |
|---|---|---|
| 6,559,769 B2 | 5/2003 | Anthony et al. |
| 6,829,478 B1 | 12/2004 | Layton et al. |
| 7,069,259 B2 | 6/2006 | Horvitz et al. |
| 7,081,813 B2 | 7/2006 | Winick et al. |
| 7,116,221 B2 | 10/2006 | Addy |
| 7,159,240 B2 | 1/2007 | England et al. |
| 7,633,388 B2 | 12/2009 | Simon et al. |
| 7,822,631 B1 | 10/2010 | Vander Mey et al. |
| 7,825,800 B2 | 11/2010 | Cox |
| 7,831,693 B2 | 11/2010 | Lai |
| 8,234,387 B2 | 7/2012 | Bradley et al. |
| 8,301,475 B2 | 10/2012 | Bean et al. |
| 8,516,380 B2 | 8/2013 | Bates et al. |
| 8,543,654 B2 | 9/2013 | Schindler et al. |
| 8,588,733 B2 | 11/2013 | Ferguson et al. |
| 8,786,425 B1 | 7/2014 | Hutz |
| 8,788,492 B2 | 7/2014 | Lu et al. |
| 8,818,995 B1 | 8/2014 | Guha |
| 8,836,467 B1 | 9/2014 | Cohn et al. |
| 8,843,997 B1 | 9/2014 | Hare |
| 8,910,244 B2 | 12/2014 | Zheng et al. |
| 9,104,537 B1 | 8/2015 | Penilla et al. |
| 9,143,503 B2 | 9/2015 | Lo et al. |
| 9,177,129 B2 | 11/2015 | Grobman et al. |
| 9,355,157 B2 | 5/2016 | Mohammed et al. |
| 9,365,187 B2 | 6/2016 | Poder |
| 9,378,601 B2 | 6/2016 | Ricci |
| 9,460,269 B2 | 10/2016 | DeLuca et al. |
| 9,485,100 B2 | 11/2016 | Weeks et al. |
| 9,503,461 B2 | 11/2016 | Fuka et al. |
| 10,185,921 B1 * | 1/2019 | Heller .................... G06Q 10/02 |
| 2003/0193404 A1 | 10/2003 | Joao |
| 2004/0135801 A1 * | 7/2004 | Thompson ........... G06Q 20/206 |
| | | 715/702 |
| 2005/0046571 A1 | 3/2005 | Stigall |
| 2006/0021018 A1 | 1/2006 | Hinton et al. |
| 2006/0179056 A1 * | 8/2006 | Rosenberg .......... G06F 16/9535 |
| 2006/0248573 A1 | 11/2006 | Pannu et al. |
| 2007/0167138 A1 | 7/2007 | Bauman et al. |
| 2007/0279209 A1 | 12/2007 | Kogan et al. |
| 2009/0027196 A1 | 1/2009 | Schoettle |
| 2010/0146118 A1 | 6/2010 | Wie |
| 2010/0164719 A1 | 7/2010 | George et al. |
| 2010/0169430 A1 | 7/2010 | Ristock et al. |
| 2012/0120930 A1 | 5/2012 | Ji et al. |
| 2012/0265573 A1 | 10/2012 | Van Pelt et al. |
| 2013/0249688 A1 | 9/2013 | Nguyen et al. |
| 2013/0253700 A1 * | 9/2013 | Carson .................... G07F 9/006 |
| | | 700/236 |
| 2014/0167983 A1 | 6/2014 | Rude et al. |
| 2014/0189802 A1 * | 7/2014 | Montgomery .......... H04L 63/08 |
| | | 726/4 |
| 2014/0266635 A1 | 9/2014 | Roth et al. |
| 2014/0309789 A1 | 10/2014 | Ricci |
| 2014/0379923 A1 | 12/2014 | Oberg et al. |
| 2015/0055822 A1 * | 2/2015 | Zhou ........................ G06F 3/017 |
| | | 382/103 |
| 2015/0100167 A1 | 4/2015 | Sloo et al. |
| 2015/0148061 A1 * | 5/2015 | Koukoumidis ....... H04W 4/022 |
| | | 455/456.1 |
| 2015/0221151 A1 * | 8/2015 | Bacco ................ G07C 9/00087 |
| | | 340/5.83 |
| 2015/0310444 A1 * | 10/2015 | Chen .................. G06Q 20/4016 |
| | | 705/44 |
| 2015/0334562 A1 * | 11/2015 | Perold .................... H04W 12/04 |
| | | 713/171 |
| 2016/0063235 A1 * | 3/2016 | Tussy ...................... G06F 21/32 |
| | | 726/6 |
| 2016/0127351 A1 * | 5/2016 | Smith .................... G06F 21/316 |
| | | 726/10 |
| 2016/0195864 A1 | 7/2016 | Kim |
| 2016/0203700 A1 | 7/2016 | Bruhn et al. |
| 2016/0217680 A1 | 7/2016 | Gu et al. |
| 2017/0244700 A1 * | 8/2017 | Yap ...................... H04L 63/0861 |
| 2018/0096690 A1 * | 4/2018 | Mixter .................... G10L 15/08 |
| 2018/0173867 A1 * | 6/2018 | De .......................... G06F 21/36 |
| 2018/0189550 A1 * | 7/2018 | McCombe ......... G06K 9/00288 |
| 2018/0234496 A1 * | 8/2018 | Ratias ..................... H04L 67/22 |
| 2018/0336327 A1 * | 11/2018 | Wallace ................. G06F 21/32 |
| 2018/0374075 A1 * | 12/2018 | Tian ........................ H04L 63/08 |

OTHER PUBLICATIONS

Black, Jenna, "Viper Launches First Home and Car Security Monitoring App," Nov. 4, 2013, safewise.com, http://www.safewise.com/blog/viper-launches-first-home-car-securitymonitoring-app/.

Ziegler et al., "Secure Profile Management in Smart Home Networks," 16th International Workshop on Database and Expert Systems Applications (DEXA '05), Aug. 22-26, 2005, pp. 209-213, IEEE, 2005.

Pawar et al., "Trust Model for Optimized Cloud Services," 2012 IFIP International Conference on Trust Management, May 21-25, 2012, pp. 97-112, Springer Berlin Heidelberg, 2012.

Habib et al., "Towards a Trust Management System for Cloud Computing," 2011 IEEE 10th International Conference on Trust, Security and privacy in Computing and Communications, Nov. 16-18, 2011, IEEE 2011.

Shen et al., "Cloud Computing System Based on Trusted Computing Platform," 2010 International Conference on Intelligent Computation Technology and Automation (ICICTA), May 11-12, 2010, pp. 942-945.

Song et al., "Trusted Anonymous Execution: A Model to Raise Trust in Cloud," 2010 9th International Conference on Grid and Cloud Computing, Nov. 1-5, 2010, pp. 133-138, IEEE 2010.

Fuchs et al., "SCanDroid: Automated Security Certification of Android Applications," University of Maryland Department of Computer Science Technical Report CS-TR-4991, Nov. 2009, http://drum.lib.umd.edu/bitstream/handle/1903/11847/CS-TR-4991.pdf?sequence=1.

Armando et al., "The AVANTSSAR Platform for the Automated Validation of Trust and Security of Service-Oriented Architectures," 2012 18th International Conference on Tools and Algorithms for the Construction and Analysis of Systems, Mar. 24-Apr. 1, 2012, pp. 267-282, Springer Berlin Heidelberg, 2012.

Thakur et al., "SHIELD: Social sensing and Help In Emergency using mobiLe Devices," 2010 IEEE Global Telecommunications Conference (GLOBECOM 2010), Dec. 6-10, 2010, pp. 1-5.

"How To: 24 Best Home Automation Ideas," Apr. 23, 2016, retrieved at http://24-7-home-security.com/the-best-home-automation-ideas-on-the-web/ on Sep. 15, 2016.

"Enjoy Home Better," Time Warner Cable, IntelligentHome, www.twc.com, accessed on Sep. 15, 2016.

"Teach Your Home New Tricks," Cox Homelife, accessed on Sep. 15, 2016.

"Rule your smart home," www.obycode.com, obycode 2016, accessed on Sep. 15, 2016.

Bouman, Amber, "5 personal safety apps that watch your back," Oct. 28, 2013.

"Personal Alarms/Track and Trace," Securitas, [http://www.securitas.se/en/security-services/alarms/personal-alarms-and-track-and-trace/], accessed on Sep. 15, 2016.

"Home Automation," [Alarm.com], accessed on Sep. 15, 2016.

* cited by examiner

MANAGING ACCESS BASED ON ACTIVITIES OF ENTITIES

BACKGROUND

Burglar alarm system functionality sometimes can be provided by one or more connected home devices. Connected home devices can provide traditional burglar alarm functionality, as well as other functionality such as Internet video feeds, remote control of connected home devices such as thermostats, lights, and appliances, or the like. Thus, connected home devices have become popular replacements for traditional burglar alarm systems that generally are not capable of providing these and other functionality.

In some instances, functionality associated with connected home devices can be used to provide services in addition to, or instead of, burglar alarm system functionality. For example, live video feeds may be accessed by users to check on children or pets; to screen visitors to a home, business, or other location remotely; to watch wildlife; to check on the home, business, or other location; for other purposes; or the like. Also, some connected home devices may provide network connectivity to devices at or near the connected home device, for example by providing a WiFi hotspot, or the like.

SUMMARY

The present disclosure is directed to managing access based on activities of entities. An entity such as a person or device ("entity") can enter a particular area associated with a gateway device, connected home device, or other computing device ("computing device") that can provide functionality as illustrated and described herein, hereinafter referred to as an "environment." The entity may enter the environment, for example, by entering into an observable or operational range of the computing device and/or a component thereof (or associated therewith) such as one or more sensors, or the like. The computing device can be configured to identify the entity, to determine an activity associated with the entity, to determine trust indicators associated with the entity, and to determine whether or not to block the activity, to allow the activity, and/or to take other actions based on the activity such as, for example, triggering alarms, sending notifications, or the like.

According to various embodiments, the computing device can be configured to determine an identity of the entity in various manners. In some instances, the computing device can determine the identity on its own, while in some other instances the computing device may determine the identity based on data obtained via communications with one or more identity sources and/or via communications with the server computer or other devices. In some embodiments, the computing device can transmit, to the server computer or the identity sources, the image data, the entity data, or other data (e.g., biometric data, device identifiers, or the like). These and other data can be transmitted by the computing device alone or as part of the captured data. Thus, in some embodiments the computing device can determine the identity of the entity, while in some other embodiments, the computing device can receive identity data that indicates an identity of the entity. The computing device also can be configured to determine an activity associated with the entity. The computing device can determine the activity based on movements of the entity, images of the entity, audio associated with the entity, communications with the entity, location of the entity, and/or other information associated with the entity, which can be obtained via the sensors or other devices. The computing device can be configured to determine the activity itself, in some embodiments, or to transmit the captured data to the server computer for determination of the activity.

The computing device also can be configured to determine, based on an identity of the entity, one or more trust indicators associated with the entity. The computing device can use the trust indicators to determine whether or not to block the activity, whether or not to allow the activity, and/or whether or not to take other actions based on the activity such as, for example, triggering alarms, sending notifications, activating or deactivating lights or other devices, or the like. According to various embodiments, the computing device can be configured to obtain the trust indicators from the server computer, from one or more trust data sources, and/or from other sources and/or devices. To obtain the trust indicators, the computing device can transmit, to the server computer, the identity data (alone or with the captured data). In some embodiments the computing device can use the received trust indicators to determine and/or generate a trust score.

Based on the trust indicators and/or the determined trust score, and based on the determined activity associated with the entity, the computing device can determine whether or not to block the detected activity associated with the entity, whether or not to allow the detected activity associated with the entity, and/or whether or not to take other actions with respect to the detected activity associated with the entity. These determinations can be based on the determined trust score or the trust indicators, which can indicate a trustworthiness of the entity with respect to various activities or an overall trustworthiness score. The computing device can be configured to block the activity, either directly or by triggering blocking of the activity. The computing device also can be configured to allow the activity directly or to trigger allowing of the activity and/or to take various actions with respect to the detected activity or to trigger such actions. The activity can be associated with a resource that is located at or near the environment or accessed via the environment and/or the computing device; an asset that is located at or near the environment or accessed via the environment and/or the computing device; or resources and/or assets that are not located at or near the environment. Thus, concepts and technologies disclosed herein can be used to allow or block activity of various types at various locations.

According to one aspect of the concepts and technologies disclosed herein, a device is disclosed. The system can include a sensor, a networking interface, a processor, and a memory. The memory can store computer-executable instructions that, when executed by the processor, cause the processor to perform operations. The operations can include collecting, using the sensor, data that can include an image; identifying, based on the image, an entity that is located in an environment including a proximity of the sensor; determining an identity that is associated with the entity; determining, based on the data, an activity associated with the entity; and obtaining, using the identity and via the networking interface, a trust indicator associated with the entity. The trust indicator can include a trust value and an entity identifier. The operations further can include determining, based on the trust indicator, if the activity should be allowed. If a determination is made that the activity should be allowed, the operations can include initiating allowing of the activity. If a determination is made that the activity associated with the entity should not be allowed, the operations can include initiating blocking of the activity.

In some embodiments, the data further can include audio data and the sensor can include an imaging device and an audio device. In some embodiments, the data further can include presence data and location data, and the sensor can include an imaging device and a presence sensor. In some embodiments, the device can include a connected home gateway device, and the entity can include a user of the connected home gateway device. In some embodiments, the computer-executable instructions, when executed by the processor, cause the processor to perform operations further including executing a background process to track movement of the entity; detecting, during the executing of the background process, a further activity associated with the entity; and determining, based on a further trust indicator, if the further activity is to be allowed.

In some embodiments, identifying the entity can include sending, directed to an identity source, captured data including the image; and receiving, from the identity source, identity data that indicates an identity associated with the entity. In some embodiments, determining the activity can include sending, directed to a server computer, captured data including the image; and receiving, from the server computer, an indication of the activity. In some embodiments, the trust indicator further can include data that specifies entity activity. The trust value can be associated with the entity identifier and the entity activity.

In some embodiments, the computer-executable instructions, when executed by the processor, cause the processor to perform operations further including generating, based on two or more trust indicators including the trust indicator, a trust score associated with the entity. In some embodiments, the activity can include accessing a resource via the networking interface. The resource can include an electronic resource, and initiating blocking of the activity can include blocking access to the electronic resource via the networking interface. In some embodiments, the activity can include accessing an asset that is located in an environment. Initiating blocking of the activity can include triggering an alarm.

According to another aspect of the concepts and technologies disclosed herein, a method is disclosed. The method can include collecting, at a computing device that can include a sensor and a networking interface, and using the sensor, data that can include an image. The method further can include identifying, by the computing device and based on the image, an entity that is located in an environment including a proximity of the sensor; determining, by the computing device, an identity that is associated with the entity; determining, by the computing device and based on the data, an activity associated with the entity; and obtaining, by the computing device and via the networking interface, and using the identity, a trust indicator that is associated with the entity. The trust indicator can include a trust value and an entity identifier. The method also can include determining, by the computing device and based on the trust indicator, if the activity should be allowed. If the computing device determines that the activity should be allowed, the method further can include initiating, by the computing device, allowing of the activity. If the computing device determines that the activity associated with the entity should not be allowed, the method further can include initiating, by the computing device, blocking of the activity.

In some embodiments, the data further can include audio data, presence data, and location data, and the sensor can include an imaging device, an audio device, and a presence sensor. In some embodiments, identifying the entity can include sending, directed to an identity source, captured data including the image; and receiving, from the identity source, identity data that indicates an identity associated with the entity. In some embodiments, the activity can include accessing a resource via the networking interface. The resource can include an electronic resource, and initiating blocking of the activity can include blocking access to the electronic resource via the networking interface. In some embodiments, the trust indicator further can include data that specifies entity activity. The trust value can be associated with the entity identifier and the entity activity.

According to yet another aspect, a computer storage medium is disclosed. The computer storage medium can store computer-executable instructions that, when executed by a processor, cause the processor to perform operations. The operations can include collecting, at a computing device that includes a sensor and a networking interface, and using the sensor, data that can include an image. The operations further can include identifying, based on the image, an entity that is located in an environment including a proximity of the sensor; determining an identity that is associated with the entity; determining, based on the data, an activity associated with the entity; and obtaining, via the networking interface and using the identity, a trust indicator that is associated with the entity. The trust indicator can include a trust value and an entity identifier. The operations further can include determining, based on the trust indicator, if the activity should be allowed. If a determination is made that the activity should be allowed, the operations further can include initiating allowing of the activity. If a determination is made that the activity associated with the entity should not be allowed, the operations further can include initiating blocking of the activity.

In some embodiments, identifying the entity can include sending, directed to an identity source, captured data including the image; and receiving, from the identity source, identity data that indicates an identity associated with the entity. In some embodiments, the activity can include accessing a resource via the networking interface. The resource can include an electronic resource, and initiating blocking of the activity can include blocking access to the electronic resource via the networking interface. In some embodiments, the trust indicator further can include data that specifies entity activity, and the trust value can be associated with the entity identifier and the entity activity.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
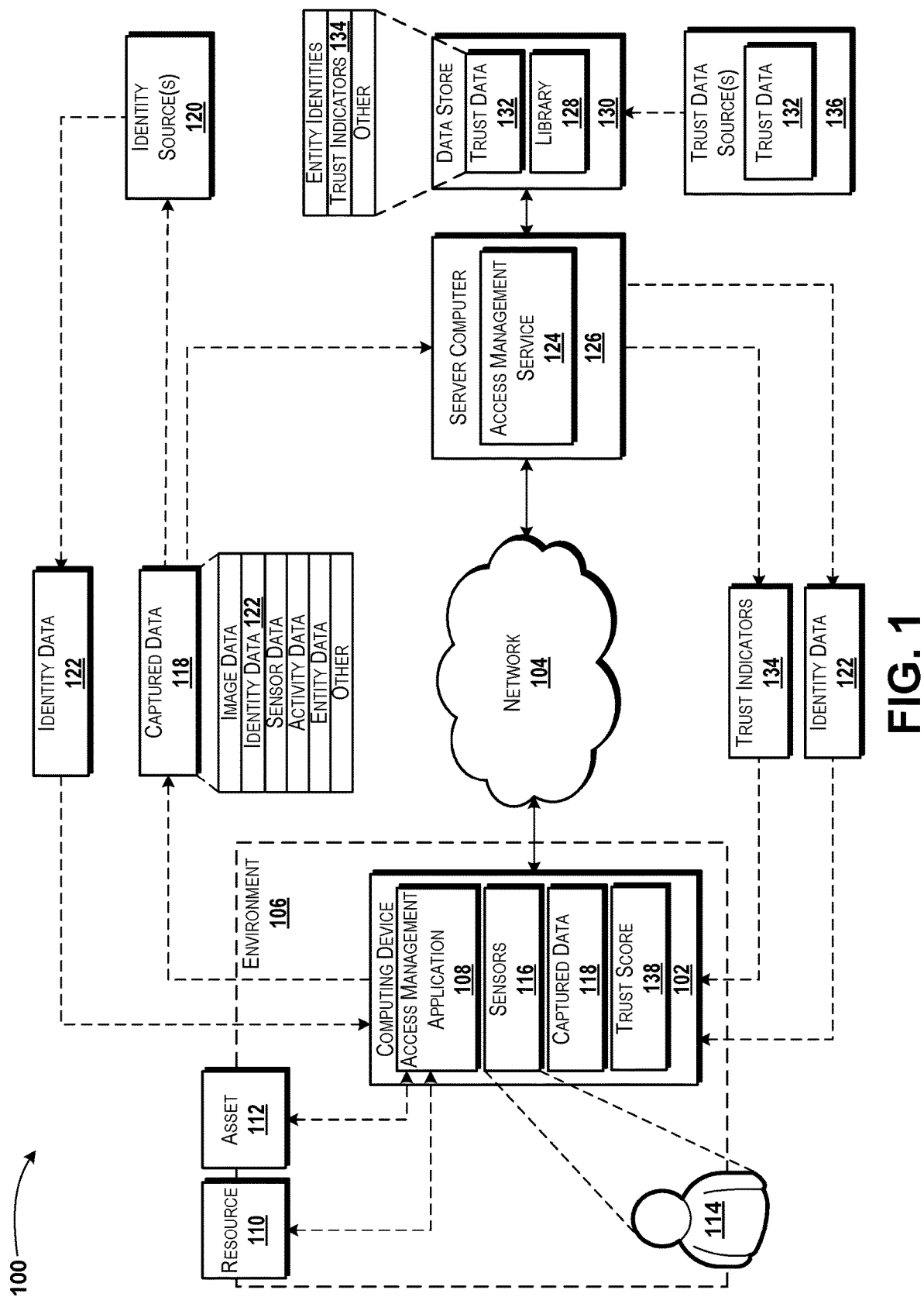
FIG. 1 is a system diagram illustrating an illustrative operating environment for various embodiments of the concepts and technologies described herein.

The following detailed description is directed to managing access based on activities of entities. An entity such as person or device can enter or be brought into an environment by entering into, or being brought into, an observable or operational range of the computing device and/or a component thereof (or associated therewith) such as one or more sensors, or the like. The computing device can be configured to identify the entity, to determine an activity associated with the entity, to determine trust indicators associated with the entity, and to determine whether or not to block the activity, to allow the activity, and/or to take other actions based on the activity such as, for example, triggering alarms, sending notifications, or the like.

According to various embodiments, the computing device can be configured to determine an identity of the entity on its own based on locally stored data and/or based on data obtained via communications with one or more identity sources and/or via communications with the server computer or other devices. In some other embodiments, the computing device can transmit, to the server computer or to one or more of the identity sources, the image data, the entity data, or other data (e.g., biometric data, device identifiers, or the like), and the identity sources and/or the server computer can determine the identity of the entity and return identity data to the computing device. The computing device can transmit the identity data and/or the image data, entity data, or other data alone or as part of captured data to other devices for identification of the entity. Thus, in some embodiments the computing device can determine the identity of the entity, while in some other embodiments, the computing device can receive identity data that indicates an identity of the entity in response to communications with other devices.

The computing device also can be configured to determine, based on movements of the entity, images of the entity, audio associated with the entity, communications with the entity, location of the entity, and/or other information associated with the entity, an activity associated with the entity. The various data used to determine the activity can be obtained via the sensors or other devices, which can include components of the computing device and/or devices in communication with the computing device. The computing device can be configured to determine the activity itself, in some embodiments. In some other embodiments, the computing device can be configured to transmit the captured data to the server computer for determination of the activity.

The computing device also can be configured to determine, based on an identity of the entity, one or more trust indicators associated with the entity. The computing device can use the trust indicators to determine whether or not to block the activity, whether or not to allow the activity, and/or whether or not to take other actions based on the activity such as, for example, triggering alarms, sending notifications, controlling connected home devices or other devices, combinations thereof, or the like. According to various embodiments, the computing device can be configured to obtain the trust indicators from the server computer, from one or more trust data sources, and/or from other sources and/or devices. To obtain the trust indicators, the computing device can transmit, to the server computer, the identity data (alone or with the captured data), and the server computer can provide the trust indicators in response. In some embodiments the computing device can use the received trust indicators to determine a trust score, though this is not included in all embodiments.

Based on the trust indicators and/or the determined trust score, and in some instances based on the determined activity associated with the entity, the computing device can determine whether or not to block the detected activity associated with the entity, whether or not to allow the detected activity associated with the entity, and/or whether or not to take other actions with respect to the detected activity associated with the entity. These determinations can be based on the determined trust score or the trust indicators, which can indicate a trustworthiness of the entity with respect to various activities or an overall trustworthiness score. The computing device can be configured to block the activity itself or to trigger blocking of the activity; to allow the activity itself or to trigger allowing of the activity; and/or to take various actions with respect to the detected activity. The activity can be associated with a resource that is located at or near the environment or accessed via the environment and/or the computing device; an asset that is located at or near the environment or accessed via the environment and/or the computing device; or resources and/or assets that are not located at or near the environment. Thus, concepts and technologies disclosed herein can be used to allow or block activity of various types and/or at various locations.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for managing access based on activities of entities will be described, according to an illustrative embodiment. The operating environment 100 shown in FIG. 1 can include a computing device 102. The computing device 102 can operate in communication with and/or as part of a communications network ("network") 104, though this is not necessarily the case.

According to various embodiments, the functionality of the computing device 102 can be provided by one or more server computers; one or more desktop computers; one or more mobile telephones or smartphones; one or more laptop, tablet, or slate computers; one or more set-top boxes, gateway devices, or other customer premises equipment ("CPE"); one or more other computing devices or systems; combinations thereof, or the like. It should be understood that the functionality of the computing device 102 can be provided by a single device, by two or more similar devices, and/or by two or more dissimilar devices. For purposes of describing the concepts and technologies disclosed herein, the computing device 102 is described herein as a gateway device such as a gateway for a connected home system and/or service such as the DIGITAL LIFE family of products and services from AT&T Digital Life, a subsidiary of AT&T Corporation in Dallas, Tex. According to various embodiments, the computing device 102 can be associated with an a structure, building, area, or other environment ("environment") 106 such as, for example, an office building, an office, a home, a room in a home, an automobile, a business, or the like. Because the computing device 102 can be associated with other environments 106, it should be understood that these examples are illustrative, and therefore should not be construed as being limiting in any way.

The computing device 102 can execute an operating system (not labeled in FIG. 1) and one or more application programs such as, for example, an access management application 108. The operating system can include a computer program that can control the operation of the computing device 102. The access management application 108 can include an executable program that can be configured to execute on top of the operating system to provide various functions as illustrated and described herein.

In particular, the access management application 108 can be configured to detect a request such as, for example, a request, by a device, to use the computing device 102 to access a resource 110. As shown in FIG. 1, the resource 110 can be located at the environment 106, near the environment 106, outside of the environment 106; and/or accessed via the environment 106 and/or the computing device 102.

According to various embodiments of the concepts and technologies disclosed herein, the resource 110 can include an electronic resource. For example, the resource 110 can include an application, a website, a service, a file, a module, or other functionality. In some other embodiments, the resource 110 can include a data source such as a database, a data store, or the like. In yet other embodiments, the resource 110 can include an access network, a private network, or other networking resource such as a WiFi hotspot, a peer-to-peer network, or the like. Thus, for purposes of illustrating and describing the concepts and technologies disclosed herein, the resource 110 should be understood as one or more electronic resources such as executable functionality, data storage, networking, or the like.

In some embodiments, the resource 110 can be associated with and/or located within or near the environment 106. In some other embodiments, the resource 110 can be located outside of the environment 106. Because other types of resources 110 can be used in accordance with the concepts and technologies disclosed herein, it should be understood that the above examples are illustrative, and therefore should not be construed as being limiting in any way.

The access management application 108 also can detect an event, as noted above. The event can include, for example, a person or device entering or being brought into the environment 106 or other area; a person or device attempting to connect another device (e.g., a phone or computer) to a network; a person or device attempting to access an asset or location ("asset") 112 such as, for example, a safe, a room, a door, a building, an area, or the like; combinations thereof; or the like. As shown in FIG. 1, the asset 112 can be located at the environment 106, near the environment 106, outside of the environment 106, and/or accessed via the environment 106 and/or the computing device 102.

According to various embodiments, the asset 112 can be within an observable and/or operational range of the computing device 102 and/or one or more sensors 116 of the computing device 102. As used in the claims, the phrase "proximity of" the sensors 116 (or a single sensor 116) is used to refer to the observable or operational range of the sensors 116. Thus, for purposes of the claims, an entity that is not observable by any of the sensors 116 can be referred to as not being "in a proximity of the sensor," and an entity that is not within an operational range of any of the sensors 116 can be referred to as not being "in the proximity of the sensor." Because other events and/or requests can be detected in accordance with the concepts and technologies disclosed herein, it should be understood that these examples are illustrative, and therefore should not be construed as being limiting in any way.

According to various embodiments, an entity 114 can be associated with the request or event detected by the access management application 108. According to various embodiments, the entity 114 can correspond to a person, device, or other entity that is associated with the detected request; that has entered the environment 106; that has been brought into the environment 106; or that otherwise has entered into a detectable and/or operational range (e.g., a visual range, a sensor range, a communication range, an audible range, and/or other range, hereinafter referred to as "range") of or associated with the computing device 102 and/or any hardware associated with the computing device 102. Thus, the entity 114 can include, but is not limited to, a user associated with the computing device 102; a person or device in a detectable and/or operational range of the computing device 102 (e.g., a guest at or near the environment 106, a trespasser or intruder at or near the environment 106, or the like); other persons or devices; or the like.

For example, the request or event ("event") detected by the access management application 108 can correspond to detecting that the entity, e.g., the entity 114, has activated the computing device 102, attempted to access the resource 110 using the computing device 102, activated or accessed an application at the computing device 102 and/or via the computing device 102, combinations thereof, or the like. Similarly, the event can correspond to the entity 114 attempting to enter a premises associated with the environment 106 and/or the computing device 102. In some other embodiments, the event detected by the access management application 108 can correspond to detecting entry of the entity 114 into the detectable and/or operational range of the computing device 102, which the access management application 108 can construe as an event or as a "request" to enter the environment 106 and/or a proximity (e.g., the detectable and/or operational range) of the computing device 102.

For example, the entity 114 can correspond to a meter reader or other entity that has entered the environment 106 and/or an area associated with the environment 106 to read a meter. The computing device 102 can, via execution of the access management application 108, detect the presence or arrival of the entity 114 and operations as illustrated and described herein can be performed to determine whether access to various assets (e.g., the asset 112), resources (e.g., the resource 110), and/or the environment 106 in general should be granted (e.g., allowed, permitted, not blocked, etc.) or blocked (e.g., not allowed, prohibited, refused, etc.); whether an alarm or alert should be created; or the like. The access management application 108 can be configured to detect such requests, events, and/or traffic and to block, allow, approve, enable, or disable such requests and/or events to be satisfied and/or to proceed using the concepts and technologies disclosed herein.

In particular, the access management application 108 can be configured to capture various types of information in response to detecting an event or request. According to various embodiments, the computing device 102 can include and/or can communicate with one or more sensors 116. The sensors 116 can include various devices for capturing images, videos, audio, light, presence, location, movement, or the like. The sensors 116 also can include proximity sensors such as photo cells, infrared ("IR") proximity sensors, photoelectric sensors, or other types of presence sensors. The sensors 116 also can include identity determination devices such as, for example, fingerprint readers, facial recognition hardware and/or software, voice recognition hardware and/or software, biometric devices, combinations thereof, or the like. The sensors 116 are illustrated in FIG. 1 as including components of the computing device 102, but it should be understood that the sensors 116 can be located externally (e.g., not within a housing or other component of the computing device 102) and can communicate with the computing device 102 via one or more wired and/or wireless connections. It also should be understood that the event can be detected by the computing device 102 using the sensors 116 and/or the various types of data or other information that can be captured by the sensors 116. It should be understood that this example is illustrative, and therefore should not be construed as being limiting in any way.

In some embodiments, the computing device 102 can activate one or more of the sensors 116 at any particular time (e.g., periodically, constantly, or at other times). In some embodiments, for example, the computing device 102 can correspond to a gateway device for a connected home service and the sensors 116 can correspond to alarm system equipment. Thus, it can be appreciated that in some instances, the sensors 116 can be activated continuously to monitor various areas, if desired. It should be understood that this example is illustrative, and therefore should not be construed as being limiting in any way.

In some other embodiments, the computing device 102 can activate one or more of the sensors 116 in response to detecting the event or request. Regardless of when the sensors 116 are activated, the computing device 102 can obtain captured data 118 and/or at least a portion of the captured data 118 using the sensors 116. For example, the sensors 116 can include an imaging device and capturing the captured data 118 can include, for example, capturing an image (e.g., a photograph, video, or the like) of the entity (e.g., the entity 114); capturing a fingerprint or voiceprint of the entity (e.g., the entity 114); combinations thereof; or the like. It should be understood that this example is illustrative, and therefore should not be construed as being limiting in any way.

Based at least partially on the captured data 118, the computing device 102 can determine an identity of the entity (e.g., the entity 114). Although not illustrated in FIG. 1, the computing device 102 can include and/or can access information that associates various types of identifying information with identities. Thus, for example, the computing device 102 can use data associated with a fingerprint (the data can be obtained by the sensors 116) to identify an identity of the entity 114 or other entity. In another example, the computing device 102 can use a photograph or other image of the entity 114 or other entity to determine an identity of the entity 114 or other entity. Similarly, the computing device 102 can access a table or other data structure that can associate various user identifiers and/or device identifiers with an entity identity. It should be understood that these examples are illustrative, and therefore should not be construed as being limiting in any way.

In some embodiments, the computing device 102 can be configured to transmit the captured data 118 (or a portion thereof) to other devices to determine the identity of the entity 114. For example, the computing device 102 can be configured to transmit the captured data 118 (or a portion thereof) to one or more identity sources 120. One or more of the identity sources 120 can be configured to analyze the captured data 118 and to match a portion of the captured data 118 to various other types and/or sources of data to identify the entity 114. In some contemplated embodiments, for example, the identity source 120 can correspond to one or more social networking services, web search engines, government or private databases or data servers, combinations thereof, or the like. The identity source 120 can be configured to perform facial recognition operations on image data that can be included in the captured data 118, for example.

Via execution of the facial recognition operations, the identity source 120 can identify the entity 114 represented by the captured data 118 (e.g., the image data) and associate, with the entity 114, one or more identities. Similarly, one or more of the identity sources 120 can be configured to use audio data (e.g., a voiceprint); fingerprint data; or other information to identify the entity 114 associated with the event or request as captured by the captured data 118. Thus, it can be appreciated that the identity sources 120 can include various types of devices that may be used to identify the entity 114 using various types of information.

In any event, the identity sources 120 can be configured to return data that describes or indicates the identity of the entity 114, which is shown in FIG. 1 as the data labeled "identity data 122." It should be appreciated that in some embodiments, the identity data 122 and/or information equivalent thereto can be determined by the access management application 108 locally, and therefore can be provided by the computing device 102 to other devices. For example, the computing device 102 can be configured to provide the identity data 122 to other devices, in some embodiments, as part of the captured data 118 as will be explained in the next paragraph. As such, it should be understood that this example embodiment of using the identity source 120 to determine an identity associated with the entity 114 is illustrative, and therefore should not be construed as being limiting in any way.

In some other embodiments, the computing device 102 can be configured to transmit the captured data 118 (or a portion thereof) to an access management service 124, which can be hosted and/or executed by a server computer 126 or other device. The access management service 124 can be configured to determine an identity associated with an entity 114 represented by the captured data 118. In particular, the access management service 124 can be configured to match a portion of the captured data 118 to various other types and/or sources of data to identify the entity 114. For example, as shown in FIG. 1, the access management service 124 can be configured to access a library 128 and/or other information that can be stored locally (e.g., at the server computer 126) or remotely (e.g., at a data store 130). It also should be understood that the identity source 120 can be configured to access a library such as the library 128, in some embodiments, to identify the entity 114.

The library 128 can include various types of data that can be used to determine an identity of the entity 114 such as, for example, photographs and identities associated with the photographs, voiceprints, biometric data, device identifiers and associated identities, combinations thereof, or the like. Thus, it can be appreciated that the access management service 124 can be configured to perform facial recognition operations similar to those described above; fingerprint recognition operations, voiceprint recognition operations, device identification, combinations thereof, or the like. The functionality of the data store 130 illustrated and described herein can be provided by one or more databases, server computers, desktop computers, mobile telephones, laptop computers, other computing systems, storage devices, combinations thereof, or the like. In the illustrated embodiments, the functionality of the data store 130 is described as being provided by a server computer. It should be understood that this example is illustrative, and therefore should not be construed as being limiting in any way.

The access management service 124 can be configured to identify the entity 114 using the captured data 118 as explained above. The access management service 124 can be configured to provide information that indicates the identity of the entity 114 to the computing device 102, for example the identity data 122 as shown in FIG. 1 and as explained above. It should be understood that this example is illustrative, and therefore should not be construed as being limiting in any way.

In addition to determining an identity of the entity 114 directly, or by receiving identity data 122 from the identity source 120 and/or the server computer 126, the computing device 102 can also be configured to use the captured data 118 to recognize or otherwise determine an activity associated with the entity 114. In some embodiments, the computing device 102 can be configured to determine the activity directly (e.g., on its own). In some other embodiments, the computing device 102 can be configured to provide the captured data 118 to the access management service 124 for determination of the activity. It therefore can be appreciated that the access management service 124 can be configured to determine the activity based on the captured data 118.

For example, the captured data 118 can include image data, sensor data, video data, or other information that may be used to determine an activity associated with the entity 114. The determination of an activity is illustrated and described in more detail below. It can be appreciated, however, that the determination of the activity can include, in some embodiments, analyzing the captured data 118 to identify one or more movements, actions, or the like, associated with the entity 114, and to determine, based on these one or more movements, actions, or the like, an activity associated with the entity 114. It should be understood that this example is illustrative, and therefore should not be construed as being limiting in any way.

According to some embodiments, the computing device 102 can be configured to recognize various types of activities based on movements, location, communications, sounds, and/or other aspects of movements and/or actions associated with the entity 114. In some other embodiments, for example, the computing device 102 can be configured to transmit the captured data 118 to the server computer 126, and the server computer 126 can be configured to determine the activity based on the captured data 118 by using the data stored in the library 128 and/or elsewhere. Regardless of where the identification of the activity occurs, the determined activity can be used to determine one or more trust indicators associated with the entity 114, as will be illustrated and described in more detail below. These trust indicators can be used to block or grant access to the resource 110 or the asset 112, and/or to determine whether or not an alarm or other action should be triggered based on the activity associated with the entity 114.

Thus, it can be appreciated that in some embodiments, the computing device 102 can capture or otherwise obtain, e.g., using the sensors 116, various types of information associated with the entity 114. For example, the computing device 102 can obtain an image of the entity 114, a sound associated with the entity 114, a movement associated with the entity 114, a communication (e.g., a wireless signal from a device associated with the entity 114) associated with the entity 114, a fingerprint or other biometric data associated with the entity 114, a location (absolute location or relative location such as distance from the environment 106 and/or distance from the computing device 102 or the like) associated with the entity 114, and/or other information.

In some embodiments, the computing device 102 can be configured to determine, based on the captured data 118 and other information (e.g., a library of information that can define various types of movements, sounds, communications, and/or other actions as corresponding to various activities), an activity associated with the entity 114. In some embodiments, as noted above, the computing device 102 can be configured to send the captured data 118 to the server computer 126 or other device, and the server computer 126 (or other device) can be configured to determine an activity based on the captured data 118. The determined activity can be represented by activity data, as shown in FIG. 1, and therefore can be provided to the computing device 102 in some embodiments by the server computer 126 or other device (not shown in FIG. 1). Regardless of whether the activity is identified at the computing device 102 or elsewhere, it can be appreciated that the activity data can be included in the captured data 118 that is provided to the server computer 126 or otherwise known to the server computer 126 (e.g., determined at the server computer 126 or elsewhere). The activity data can be used to determine one or more trust indicators as will be illustrated and described herein in more detail.

According to various embodiments, the server computer 126 can receive the captured data 118. It can be appreciated herein that the captured data 118 and/or portions thereof can be provided to the server computer 126 one or more times in some embodiments. In particular, the image data can be provided to the server computer 126 to identify an entity 114 in a first communication and the activity data and the identity data 122 can be provided to the server computer 126 in a second communication. It can be appreciated that more than two communications may be used, in some embodiments. Similarly, it can be appreciated that the captured data 118 can include the identity data 122 and the activity data in a first communication, in some embodiments. Thus, the illustrated and described embodiments encompass one or more communications of the captured data 118 and/or portions thereof to the server computer 126, in various embodiments.

The server computer 126 can be configured, via execution of the access management service 124, to receive the captured data 118 (or portions thereof), and to provide one or more types of information in response to receiving the captured data 118 and/or portions thereof. In particular, as explained above, the server computer 126 can be configured to respond to receiving the image data from the computing device 102 by identifying an entity 114 represented by the image data and providing, to the computing device 102, the identity data 122 as explained above. In some embodiments, the identification of the entity 114 can occur at other devices including, but not limited to, the computing device 102 and/or the identity source 120, so it can be appreciated that this functionality can be omitted from the access management service 124 in some embodiments. It therefore should be understood that this example is illustrative, and therefore should not be construed as being limiting in any way.

The server computer 126 also can be configured to receive sensor data, image data, and/or other information (e.g., data that describes communications detected at the computing device 102, video data, audio data, biometric data, or other information) and to determine, based on these and other types of the captured data 118, an activity associated with the entity 114. As noted above, the server computer 126 can respond to receiving the captured data 118 and/or portions thereof by providing activity data to the computing device 102. It should be understood that this example is illustrative, and therefore should not be construed as being limiting in any way.

The server computer 126 also can be configured to receive the identity data 122 and the activity data and/or other types of captured data 118 and to determine, based on these and other types of the captured data 118, one or more trust indicators 134 that are associated with the identity of the entity 114. The trust indicators 134 can be used to determine whether activity associated with the entity 114 should be allowed or blocked, as well as for additional and/or alternative actions and/or determinations. For example, as noted above, the trust indicators 134 can be used to determine if an alarm, an alert, or another notification should be generated based on the presence and/or activity of the entity at or near the environment 106. Although not shown in FIG. 1, it can be appreciated that the computing device 102 can be configured to transmit an alert, alarm, or notification to various entities such as, for example, a user, an application, a network operator, an alarm monitor, a public safety entity, combinations thereof, or the like.

According to some embodiments, the server computer 126 can be configured to access trust data 132 to determine the trust indicators 134. The trust data 132 can include the trust indicators 134, entity identities, and/or other data or information. In some embodiments, the other data or information can capture associations between the trust indicators 134 and the entity identities. Thus, it can be appreciated that a device or entity such as the server computer 126 can access the trust data 132 (or source of the trust data 132) to determine the trust indicators 134 based on the identity data 122. It should be understood that this example is illustrative, and therefore should not be construed as being limiting in any way.

In some embodiments, the trust data 132 can be stored at the data store 130. In some other embodiments, the trust data 132 can be generated by a trust data source 136 and/or stored at the trust data source 136. Thus, while the communications are illustrated in FIG. 1 as occurring between the server computer 126 and the data store 130, it should be understood that the server computer 126 and/or the computing device 102 can communicate with the trust data source 136 to obtain the trust indicators 134. In some embodiments, the computing device 102 can communicate directly with one or more trust data sources 136 to obtain the trust data 132 and/or the trust indicators 134. As such, the illustrated embodiment should be understood as being illustrative and should not be construed as being limiting in any way.

The functionality of the trust data source 136 can be provided by various entities. In some embodiments, for example, the functionality of one or more of the trust data sources 136 can be provided by a social networking service and/or other sources of data that relates to a particular entity 114. In some other embodiments, the functionality of one or more of the trust data sources 136 can be provided by government or private databases or other resources that can store information that relates to the entity 114 and can be used to determine a trustworthiness (e.g., can include background information, credit information, and the like). In some other embodiments, the functionality of one or more of the trust data sources 136 can be provided by research services such as, for example, credit agencies, research services (e.g., background search services, legal research services, or the like), or other services. In some other embodiments, the functionality of one or more of the trust data sources 136 can be provided by search engines and/or people finders or the like. In yet other embodiments, the functionality of one or more of the trust data sources 136 can be provided by Internet search engines, or the like. It should be understood that these examples are illustrative, and therefore should not be construed as being limiting in any way.

The data obtained from the trust data sources 136, which can relate to the particular entity 114, can be used to determine a trustworthiness associated with the entity 114, in some embodiments. In some embodiments, the trust data 132 stored by the trust data sources 136 can include one or more trust indicators 134, while in some other embodiments, the trust data 132 stored by the data store 130 can include the trust indicators 134, where the trust indicators 134 may be generated by the server computer 126 based on the trust data 132. For example, the determined trustworthiness (based on the trust data 132) can be represented by the trust indicators 134, in some embodiments.

The trust indicators 134 can comprise one or more values and/or other data that can be analyzed to determine a trustworthiness and/or trust value for a particular entity. The trustworthiness or trust value can further be tied to a particular activity, in some embodiments, or a particular type of activity, a particular category of activity, or the like. In some embodiments, the trust indicators 134 also can be associated with a particular location, a particular environment, particular devices, or the like. Thus, one or more trust indicators 134 for a particular entity 114 can be used to determine, for a particular activity, location, environment 106, device, combinations thereof, or the like, an associated trust value or score ("trust value").

The trust value can provide a numerical or other value that can represent a trustworthiness for the entity 114 in general, or for specific circumstances such as for particular activities, locations, environments 106, times, devices, combinations thereof, or the like. The trust value can be used, for example, to determine if the entity 114 is trustworthy to perform a particular activity at or near the environment 106. In some embodiments, the trust indicators 134 can therefore include an activity descriptor and a trust value, as shown below in TABLE 1. TABLE 1 schematically illustrates a sample format for the trust data 132 according to one contemplated embodiment of the concepts and technologies disclosed herein. Based on the above description, it can be appreciated that the sample format can include additional columns for information such as locations, devices, environments, times, dates, combinations thereof, or the like. As such, the sample format shown in TABLE 1 is illustrative and should not be construed as being limiting in any way.

TABLE 1

| Trust Value | Activity Descriptor | Entity |
| --- | --- | --- |
| 88.9 | Accessing resource$_a$ | Entity$_a$ |
| 87.4 | Accessing asset$_a$ | Entity$_a$ |
| 97.8 | Walking on property at location$_a$ | Entity$_a$ |
| <N/A> | Entering building at location$_a$ | Entity$_a$ |
| ... | ... | Entity$_n$ |
| 90.7 | Accessing WiFi Network at location$_a$ | Entity$_a$ |

As shown in TABLE 1, a trust value can be defined for various activities, types of activities, and/or categories of activities. If no trust value is known for a particular activity (e.g., entering home), this could be due to that activity never occurring with respect to an associated entity 114 or identity, that the activity has not occurred enough times to determine an associated trust value, or for other reasons. Thus, it can be appreciated from the example trust data 132 illustrated in TABLE 1 that the entity named "Entity$_a$" has never entered a building at the location entitled location$_a$. Of course, this example is purely illustrative of how the trust data 132 can be arranged, in some embodiments and should not be construed as being limiting in any way. It also can be appreciated that a row as shown in TABLE 1 can correspond, in this example embodiment, to a trust indicator 134 illustrated and described herein. Namely, a row of TABLE 1 can define a trust value for a particular entity 114 or identity performing a particular activity. It should be understood that this example is illustrative, and therefore should not be construed as being limiting in any way.

The trust indicators 134 can be provided to the computing device 102 and the computing device 102 can determine a trust score 138 for the entity 114, in some embodiments. In some other embodiments, the trust score 138 is not determined by the computing device 102. The trust score 138, if determined, can define a general, overall, or average trustworthiness for the entity 114 based on the trust indicators 134. Thus, the trust score 138 can provide a value that will be applied to any activity detected at the computing device 102 to determine whether or not to grant or block access to a resource 110 and/or an asset 112, as well as to determine whether or not to generate an alarm, alert, notification, or the like. It should be understood that this example is illustrative, and therefore should not be construed as being limiting in any way.

In some embodiments, the trust score 138 can be calculated by the computing device 102 as an average of the trust values of the trust indicators 134. In some embodiments, some trust indicators 134 may be weighted, ignored, or otherwise considered to be less important or more important than other trust indicators 134. Thus, the trust score 138 can provide a value to apply to any activity, as opposed to particular activities. Also, it should be understood that various ranges of trust scores 138 or trust values can be determined to indicate that various activities should or should not be allowed, or the like. It should be understood that this example is illustrative, and therefore should not be construed as being limiting in any way.

In some other embodiments, the trust indicators 134 can be used to determine whether or not to block or allow a particular activity, or to take other actions such as generating alarms, alerts, notifications, or the like. In particular, a trust indicator 134 that specifies a trust value for a particular activity, a particular location, a particular device, a particular time, a particular date, a particular environment 106, and/or the like, can be used to determine whether to allow or block a similar activity that is detected at the computing device 102 (which may be located at the a particular location and a particular environment 106, and which may correspond to the particular device) at a particular time and a particular date, etc. The trust indicator 134 also can be used, as illustrated and described herein, to determine whether or not to generate an alarm, alert, notification, or the like. In some embodiments, the computing device 102 therefore can determine for a particular entity 114, an activity, and can determine whether or not to allow or block the activity, as well as whether or not to take other actions based on detecting the activity. It should be understood that this example is illustrative, and therefore should not be construed as being limiting in any way.

In practice, an entity 114 can enter a particular area such as the environment 106. As noted above, the entity 114 can be considered to have entered the area when the entity 114 or a device associated with the entity is within an observable or operational range of the computing device 102. Thus, for example, the entity 114 may be considered in the area when the entity 114 is within a visual range of a sensor 116 of the computing device 102 such as an imaging device (e.g., a camera, a charge-coupled device ("CCD") image sensor, or other imaging device); within audible range of a sensor 116 of the computing device 102 such as a microphone or the like; within communication range of a communication device of the computing device 102 (e.g., a WiFi transceiver, a BLUETOOTH transceiver, or other device); within detectable range of a sensor 116 of the computing device 102 such as a proximity device (e.g., an infrared sensor, or the like); or within operational and/or detectable range of other sensors 116 of the computing device 102 (or of sensors 116 that are in communication with the computing device 102). Because additional examples of entering into a range of the computing device 102 have been illustrated and described herein, it should be understood that these examples are illustrative, and therefore should not be construed as being limiting in any way.

In some embodiments, the computing device 102 can operate as a gateway device, a connected home device, a burglar alarm system device, or other device that may be configured to provide burglar alarm functionality or other functionality. The computing device 102 can be configured to determine an activity associated with the entity 114 and to determine whether or not to block the activity, whether or not to allow the activity, and/or whether or not to take other actions based on the activity such as, for example, triggering alarms, sending notifications, or the like.

According to various embodiments, the computing device 102 can be configured to determine an identity of the entity 114. The computing device 102 can determine the identity directly (e.g., on its own) or based on information that can be obtained via communications with one or more identity sources 120, via communications with the server computer 126, or via communications with other devices. In some embodiments, the computing device 102 can transmit, to the server computer 126 or the identity sources 120, the image data, the entity data, or other data (e.g., biometric data, device identifiers, or the like). These and other data can be transmitted by the computing device 102 alone, or as a part of the captured data 118. Thus, in some embodiments the computing device 102 can determine the identity of the entity 114, while in some other embodiments, the computing device 102 can receive identity data 122 that indicates an identity of the entity 114. It should be understood that these examples are illustrative, and therefore should not be construed as being limiting in any way.

The computing device 102 also can be configured to determine, based on movements of the entity 114, images of the entity 114, audio associated with the entity 114, communications with the entity 114, location of the entity 114, and/or other information associated with the entity 114 (which can be obtained via the sensors 116 or other devices), an activity associated with the entity 114. The computing device 102 can be configured to determine the activity itself, in some embodiments, or to transmit the captured data 118 to the server computer 126 for determination of the activity. It should be understood that these examples are illustrative, and therefore should not be construed as being limiting in any way.

The computing device 102 also can be configured to determine, based on an identity of the entity 114, one or more trust indicators 134 associated with the entity 114. The computing device 102 can use the trust indicators 134 to determine whether or not to block the activity, whether or not to allow the activity, and/or whether or not to take other actions based on the activity such as, for example, triggering alarms, sending notifications, or the like. According to various embodiments, the computing device 102 can be configured to obtain the trust indicators 134 from the server computer 126, from one or more trust data sources 136, and/or from other devices. To obtain the trust indicators 134, the computing device 102 can transmit, to the server computer 126, the identity data 122 (alone or with the captured data 118). In some embodiments the computing device 102 can use the received trust indicators 134 to determine a trust score 138, though this is not included in all embodiments.

Based on the trust indicators 134 and/or the determined trust score 138, and based on the determined activity associated with the entity 114, the computing device 102 can determine whether or not to block the detected activity associated with the entity 114, whether or not to allow the detected activity associated with the entity 114, and/or whether or not to take other actions with respect to the detected activity associated with the entity 114 (e.g., to trigger an alarm, send a notification, or the like). These determinations can be based on the determined trust score 138 or the trust indicators 134, which can indicate a trustworthiness of the entity 114 with respect to various activities.

Thus, for example, if a trust indicator 134 for an activity such as connecting to a WiFi network indicates a low level of trustworthiness (e.g., if the entity previously has connected to WiFi to conduct malicious activity such as uploading viruses, sending SPAM, or the like), the entity 114 can be deemed to have a low level of trustworthiness on the adopted scale for an activity such as attempting to connect to a WiFi network. As such, the activity in this example, namely attempting to connect to the WiFi network, may be blocked by the computing device 102 based on a trust indicator 134 that can define a low trustworthiness for this activity. It should be understood that this example is illustrative, and therefore should not be construed as being limiting in any way.

Various scales are possible for the trust indicators 134. In some embodiments, for example, the trust indicators 134 can include ranges of values, for example from zero to ten, with zero indicating no trustworthiness or the lowest level trustworthiness possible; and ten indicating the most trustworthiness or the highest level trustworthiness possible; or a reverse (i.e., ten being the lowest trustworthiness and zero being the highest trustworthiness). In some other embodiments, value ranges can include ranges from zero to one hundred, zero to one thousand, one to five, one to three, or other ranges; letter scores such as A through F; binary indicators such as zero/one, trustworthy/not trustworthy, true/false, yes/no, or other indicators; and/or other ranges, values, parameters, or indicators. Because the determination of a scale or range is generally known, this aspect of the concepts and technologies disclosed herein will not be further discussed herein. It should be understood that the above examples are illustrative, and therefore should not be construed as being limiting in any way.

The computing device 102 can be configured to block the activity itself or to trigger blocking of the activity; allow the activity itself or to trigger allowing of the activity; and/or to take various actions with respect to the detected activity or to trigger the taking of such actions. The activity can be associated with a resource 110 that is located at or near the environment 106 (or accessed via the environment 106 and/or the computing device 102); an asset 112 that is located at or near the environment (or accessed via the environment 106 and/or the computing device 102); or resources 110 and/or assets 112 that are not located at or near the environment 106. Thus, concepts and technologies disclosed herein can be used to allow or block activity of various types.

FIG. 1 illustrates one computing device 102, one network 104, one resource 110, one identity source 120, one server computer 126, one data store 130, and one trust data source 136. It should be understood, however, that various implementations of the operating environment 100 can include zero, one, or more than one computing device 102; zero, one, or more than one network 104; zero, one, or more than one resource 110; zero, one, or more than one identity source 120; zero, one, or more than one server computer 126; zero, one, or more than one data store 130; and/or zero, one, or more than one trust data source 136. As such, the illustrated embodiment should be understood as being illustrative, and should not be construed as being limiting in any way.

Figure 2:
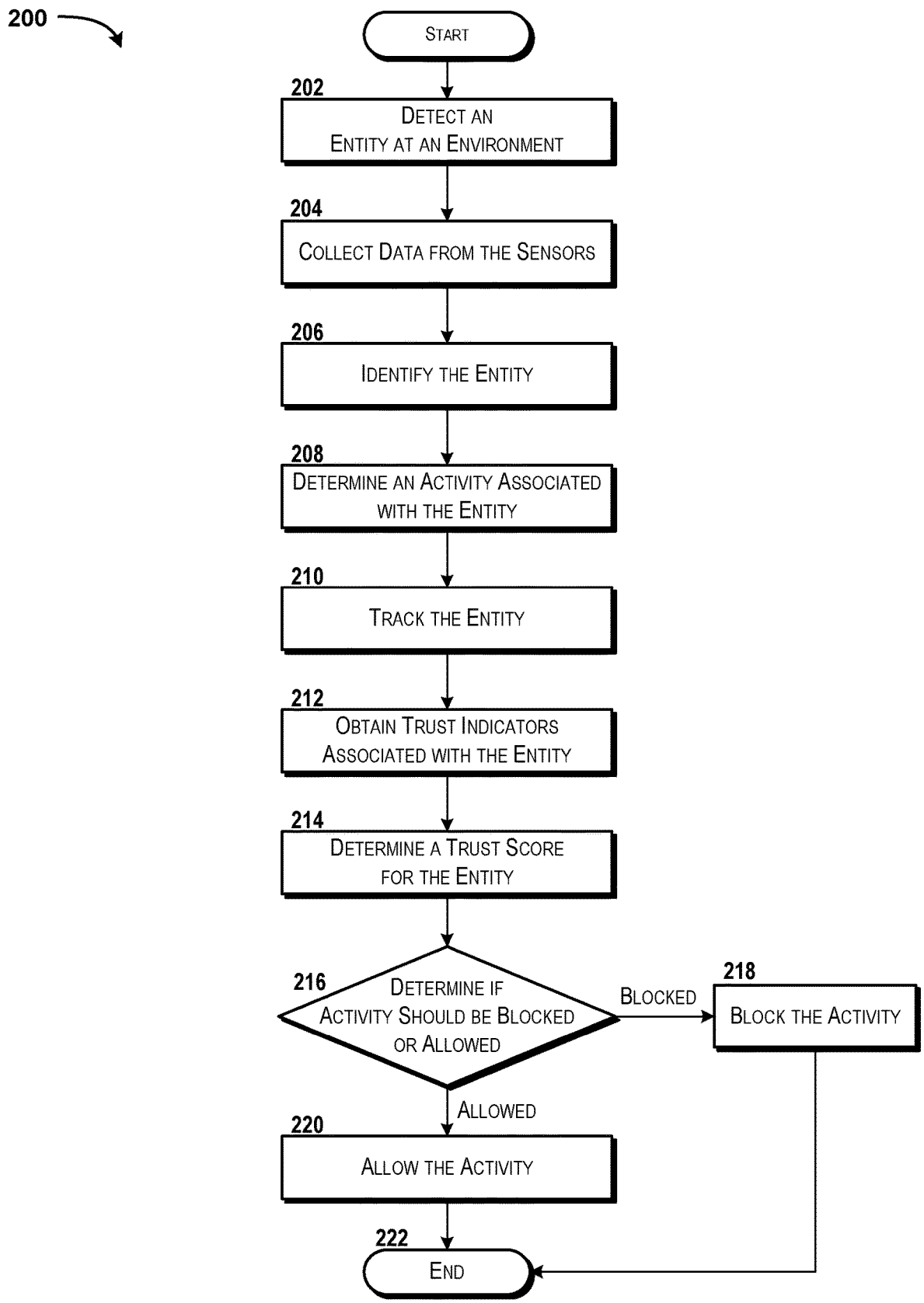
FIG. 2 is a flow diagram showing aspects of a method for managing access based on activities of entities, according to an illustrative embodiment of the concepts and technologies described herein.

Turning now to FIG. 2, aspects of a method 200 for managing access based on activities of entities will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102, the server computer 126, the identity source(s) 120, the trust data source(s) 136, and/or other devices to perform one or more operations and/or causing the processor to direct other components of the computing system or device to perform one or more of the operations.

For purposes of illustrating and describing the concepts of the present disclosure, the method 200 is described herein as being performed by the computing device 102 via execution of one or more software modules such as, for example, the access management application 108. It should be understood that additional and/or alternative devices and/or network nodes can provide the functionality described herein via execution of one or more modules, applications, and/or other software including, but not limited to, the access management application 108. Thus, the illustrated embodiments are illustrative, and should not be viewed as being limiting in any way.

The method 200 begins at operation 202. At operation 202, the computing device 102 can detect an entity 114 at an environment. For example, the computing device 102 can detect the entity 114 at the environment 106. Thus, operation 202 can correspond to the computing device 102 detecting an access attempt by the entity 114. According to various embodiments of the concepts and technologies disclosed herein, an "access attempt" can correspond to an attempt, by an entity 114, to access a resource 110 or an asset 112. According to various embodiments, the access attempt can occur at, near, or via the environment 106 and/or the computing device 102.

For example, an entity 114 may attempt to access a resource 110 via a network connection provided by the computing device 102. In another example, the entity 114 may attempt to enter the environment 106 or an asset 112 associated with the environment 106. Regardless of what type of access is being requested or attempted, the access attempt detected in operation 202 can correspond to an attempt to access a resource 110 or asset 112 at or via the environment 106, the computing device 102, or a component associated with the environment 106 and/or the computing device 102. It should be understood that this example is illustrative, and therefore should not be construed as being limiting in any way.

In some embodiments of the concepts and technologies disclosed herein, the functionality of operation 202 can be replaced with an operation for detecting, by the computing device 102, a request or event. Thus, the computing device 102 can detect a request as illustrated and described herein, or an event as illustrated and described herein. It also should be understood that detecting the entity 114 at the environment 106 can include detecting the entity 114 in an operational and/or observable range of one or more sensor 116, and is not limited to the entity 114 actually entering into a defined environment 106. Thus, it should be understood that these examples are illustrative, and therefore should not be construed as being limiting in any way.

From operation 202, the method 200 can proceed to operation 204. At operation 204, the computing device 102 can collect data from the sensors 116 and/or other hardware. As explained herein, the data from the sensors 116 can be used to generate the captured data 118. The sensors 116 can be included as one or more components of the computing device 102, in some embodiments. In some other embodiments, the sensors 116 can be external to the computing device 102, but can communicate with the computing device 102 to provide sensor readings, image data, audio data, video, presence data, location data, other information, combinations thereof, or the like. Thus, while the sensors 116 are shown in FIG. 1 as components of the computing device 102, it should be understood that this embodiment is illustrative and should not be construed as being limiting in any way.

Thus, operation 204 can include the computing device 102 obtaining the data from the sensors 116 by activating the sensors 116, by receiving data from the sensors 116, and/or by otherwise obtaining the data from the sensors 116 and/or other devices. In addition to obtaining the various readings and/or other data from the sensors 116, the computing device 102 can package the various sensor readings, audio data, video data, image data, presence data, location data, device identifiers, communication data (e.g., protocols, device identifiers, user identifiers, Internet protocol ("IP") addresses, international mobile subscriber identities ("IMSIs"), international mobile equipment identities ("IMEIs"), combinations thereof, or the like) and/or other data to form the captured data 118. Thus, it should be understood that operation 204 can include not only obtaining various types of data from the sensors 116, but also generating the captured data 118 illustrated and described herein using the data collected in operation 204. Thus, it can be appreciated that another operation can be illustrated in FIG. 2 for generating the captured data 118 using the data collected in operation 204 and/or other data as illustrated and described herein. It should be understood that this example is illustrative, and therefore should not be construed as being limiting in any way.

From operation 204, the method 200 can proceed to operation 206. At operation 206, the computing device 102 can identity an entity 114 associated with the access attempt. As explained above, various embodiments of identifying the entity 114 are contemplated and are possible in accordance with the concepts and technologies disclosed herein. In some embodiments, the computing device 102 can be configured to identify the entity 114, while in some other embodiments the computing device 102 can be configured to communicate with other devices such as, for example, the identity source 120, the server computer 126, and/or other devices to identify the entity 114.

In some embodiments, for example, the computing device 102 can determine, from data included in the captured data 118 (or the data used to generate the captured data 118) an identity of the entity 114. For example, the computing device 102 can maintain a list of associated identifiers such as user identifiers, device identifiers, or the like. The computing device 102 can be configured to compare one or more identifiers collected in operation 204 to the list and to identify, based on this comparison, an entity 114 and/or an identity associated with entity 114. It should be understood that this example is illustrative, and therefore should not be construed as being limiting in any way.

In some other embodiments, the computing device 102 can send the captured data 118 generated by the computing device 102 to another device to identify the entity 114 and/or an associated identity. In some instances, the computing device 102 can provide the captured data 118 to one or more identity sources 120. The identity source(s) 120 can determine an identity of an entity 114 represented by the captured data 118 and provide, to the computing device 102, identity data 122 that represents the determined identity and/or the entity 114. In some other instances, the computing device 102 can provide the captured data 118 to the server computer 126. The server computer 126 (via execution of the access management service 124) can determine the identity of the entity 114 and provide the identity data 122 to the computing device 102. As explained above, the identity sources 120 and/or the server computer 126 can be configured to perform various operations to identify the entity 114 including, but not limited to, facial recognition, accessing libraries such as the library 128, biometric data comparisons, and/or other operations. Because the entity 114 and/or an associated identity can be determined in additional or alternative manners, it should be understood that these examples are illustrative, and therefore should not be construed as being limiting in any way.

From operation 206, the method 200 can proceed to operation 208. At operation 208, the computing device 102 can determine an activity associated with entity 114 identified in operation 206. According to various embodiments of the concepts and technologies disclosed herein, the computing device 102 can perform multiple operations to identify the activity. In some other embodiments, the computing device 102 can be configured to transmit the captured data 118 to the server computer 126 for identification of the activity. In embodiments in which the computing device 102 determines the activity, the computing device 102 can be configured to analyze the captured data 118 and/or the data used to generate the captured data 118 and determine, based on the analysis, the activity.

In some embodiments, the computing device 102 can be configured to perform one or more levels of analysis on the data collected in operation 204 to determine the activity. For example, the computing device 102 can analyze image data (e.g., photographs, video, or other images or image sequences) to determine movements and/or locations of the entity 114. The computing device 102 also can analyze location data (e.g., GPS data; location device data from a beacon, location server or the like; or other location information such as signal triangulation and/or other analysis) to determine movements of, locations of, and/or distances to/from the entity 114. The computing device 102 also can analyze audio data (e.g., sounds, microphone signals, other signals, or other audio) to determine sounds being made by the entity 114. The computing device 102 also can analyze communication signals (e.g., WiFi signals, BLUETOOTH signals, cellular signals, other signals, or the like) to determine electronic activity of the entity 114 (e.g., attempts to connect to networking hardware, electronic requests occurring via a network connection, or the like). The computing device 102 also can analyze one or more readings from one or more presence sensors (e.g., IR sensors, pressure sensors, other presence sensors, or the like) to determine presence, movements, and/or locations of the entity 114. The computing device 102 also can analyze alarm system readings (e.g., door sensors, presence sensors, motion detector readings, combinations thereof, or the like) to determine movements and/or locations of the entity 114. Because the sensors 116 illustrated and described herein can include additional and/or other sensors and/or devices, and because the computing device 102 can analyze the additional and/or other data from these sensors and/or devices to determine other actions by the entity 114, it should be understood that these examples are illustrative, and therefore should not be construed as being limiting in any way.

From operation 208, the method 200 can proceed to operation 210. At operation 210, the computing device 102 can track the entity 114. It can be appreciated that the computing device 102 can determine locations, movements, and activity of the entity 114 (both physical activity and electronic activity) using the data collected from the sensors at one or more time. Thus, in operation 210, the computing device 102 can track the entity 114. It should be understood that to track the entity 114, the computing device 102 may perform operations similar to operations 204 and 208 multiple times iteratively, thereby capturing data from the sensors 116 and determining various aspects of action of the entity 114 based on the data captured from the sensors 116. Although operation 210 is shown as being performed before the next operation in FIG. 2, it should be understood that the tracking of the entity 114 by the computing device 102 can continue as other operations of the method 200 are performed as illustrated and described below. Thus, while the method 200 is executed, the computing device 102 can track additional activity of the entity 114. As additional activities are detected, the operations illustrated and described herein for determining whether to allow or block the activity (and/or to take other actions such as triggering alarms or the like) can be performed by the computing device 102.

Thus, some embodiments of the concepts and technologies disclosed herein include the computing device 102 tracking the entity 114 (e.g., as a background process) while the computing device 102 determines whether to block or allow a first activity. While analyzing the first activity to determine whether to block or allow the first activity, the computing device 102 can detect a second activity via the background process. The computing device 102 can be configured to determine whether to block or allow the second activity and/or whether to trigger additional actions. Thus, it can be appreciated that the computing device 102 can analyze multiple activities detected at different times using the concepts and technologies disclosed herein. It should be understood that this example is illustrative, and therefore should not be construed as being limiting in any way.

From operation 210, the method 200 can proceed to operation 212. At operation 212, the computing device 102 can obtain one or more trust indicators 134 associated with the entity 114. According to various embodiments, the trust indicators 134 obtained in operation 212 can be associated with the entity 114 identified in operation 206 and the activity determined in operation 208. As explained above, some embodiments of the trust indicators 134 can include a trust value, an entity identifier, and an associated activity. In some other embodiments, the trust indicators 134 can include additional data. According to various embodiments, the trust indicators 134 include at least an entity identifier and an associated trust value. Thus, the trust indicators 134 can indicate at least a trust value associated with the entity 114 identified in operation 206, and in some embodiments the trust indicators 134 can further indicate an activity associated with the trust value. One example of the trust data 132, which can include the trust indicators 134, is schematically illustrated in TABLE 1 as explained with reference to FIG. 1. It should be understood that this example is illustrative, and therefore should not be construed as being limiting in any way.

As explained above, various embodiments of obtaining the trust indicators 134 are possible and are contemplated in accordance with the concepts and technologies disclosed herein. In some embodiments, the computing device 102 can be configured to identify the entity 114 or to receive the identity data 122 that can be used to identify the entity 114. The computing device 102 can be configured to communicate with other devices such as, for example, the server computer 126, to obtain the trust indicators 134.

In some embodiments, the computing device 102 can send the captured data 118 or other data that can identify the entity 114 (e.g., the identity data 122 and/or other identifiers) to the server computer 126 as part of the captured data 118. The server computer 126 (via execution of the access management service 124) can access the trust data 132 to identify one or more trust indicators 134 associated with the entity 114 and/or the identity of the entity 114. The server computer 126 can provide the identified trust indicators 134 to the computing device 102. Because the trust indicators 134 can be obtained in additional and/or alternative manners, it should be understood that this example is illustrative, and therefore should not be construed as being limiting in any way.

From operation 212, the method 200 can proceed to operation 214. At operation 214, the computing device 102 can determine a trust score 138 associated with the entity identified in operation 206. As noted above, some operations of the method 200 can be omitted, and operation 214 can be omitted according to various embodiments. As explained above, in embodiments that include the determination of a trust score 138, the obtained trust indicators 134 can be used to generate the trust score 138.

In some embodiments, the trust indicators 134 can be used to generate a trust score 138 that corresponds to an average of the trust indicators 134. In some other embodiments, the computing device 102 can weight some of the trust indicators 134 before calculating the trust score 138. According to various embodiments, the trust score 138 represents a combined score of some or all of the obtained trust indicators 134. In one contemplated embodiment, the trust score 138 represents a combined average of all trust values associated with the obtained trust indicators 134. It should be understood that these examples are illustrative, and therefore should not be construed as being limiting in any way.

From operation 214, the method 200 can proceed to operation 216. At operation 216, the computing device 102 can determine if the activity determined in operation 208 should be blocked or allowed. It can be appreciated that the determination made in operation 216 can be based at least on the activity determined in operation 208 and either the trust score 138 or a trust indicator 134. Based on a perceived trustworthiness for activity such as the activity determined in operation 208, the computing device 102 can determine if the activity determined in operation 208 should be allowed or blocked.

According to some embodiments, the trust score 138 can be used to determine whether to block or allow the activity (and/or to take other actions such as triggering alarms, etc.). According to some other embodiments, the trust indicators 134 can be used to determine whether to block or allow the activity (and/or to take the other actions). It can be appreciated that in embodiments that use a trust score 138, the determination of the activity associated with the entity 114 may be superfluous, and that as a result, embodiments that use the trust score 138 can omit operation 208. Thus, some embodiments of the concepts and technologies disclosed herein that use a trust score 138 can provide management of access with less computing and/or time required as the determination of the activity can be omitted from some of these embodiments. It should be understood that this example is illustrative, and therefore should not be construed as being limiting in any way.

In some other embodiments, the computing device 102 can compare the activity determined in operation 208 to a trust indicator 134 that is associated with the same or similar activity. Thus, the computing device 102 can analyze the trust indicators 134 to identify a trust indicator 134 that is most relevant to the activity identified in operation 208. In some embodiments, a direct match may not exist between an activity specified by a trust indicator 134 and the activity determined in operation 208. Thus, in some embodiments the computing device 102 can analyze the trust indicators 134 to identify a most relevant trust indicator 134 (e.g., a trust indicator that specifies a same category or type of activity as the activity identified in operation 208). For example, if the computing device 102 determines that the activity of the entity 114 is accessing (via an electronic device) a web site or other resource 110 via a network connection provided by the computing device 102, the computing device 102 can identify a most relevant trust indicator 134 (e.g., a trust indicator 134 that addresses accessing the resource 110, using network connections of the computing device 102, or the like). It should be understood that this example is illustrative, and therefore should not be construed as being limiting in any way.

In another example, if the computing device 102 determines that the activity of the entity 114 is attempting to touch an asset 112, the computing device 102 can identify a most relevant trust indicator 134 (e.g., a trust indicator 134 that addresses entering the environment 106, entering a proximity of the asset 112, or the like). It should be understood that this example is illustrative, and therefore should not be construed as being limiting in any way.

If the computing device 102 determines, in operation 216, that the activity determined in operation 208 should be blocked (or should not be allowed), the method 200 can proceed to operation 218. In operation 218, the computing device 102 can block the activity determined in operation 208. Thus, the computing device 102 can block access to the resource 110 or asset 112. It should be understood that in some embodiments, the computing device 102 may not directly block the activity. In particular, the computing device 102 can be configured to trigger blocking of the activity by, for example, notifying other another device (or devices) to block the activity. Also, it should be understood that the computing device 102 can determine that other actions should be performed in operation 218 (or other operations not illustrated in FIG. 2) such as, for example, generating an alarm, alert, notification, or the like. Thus, flow of the method 200 to operation 218 can result in triggering of an alarm, blocking of activity, and the like. It should be understood that this example is illustrative, and therefore should not be construed as being limiting in any way.

If the computing device 102 determines, in operation 216, that the activity determined in operation 208 should be allowed (or should not be blocked), the method 200 can proceed to operation 220. In operation 220, the computing device 102 can allow the activity determined in operation 208. Thus, the computing device 102 can be configured to allow access to the resource 110 or asset 112. It should be understood that in some embodiments, the computing device 102 may not directly allow the activity, and that as such, operation 220 can correspond to the computing device 102 determining not to block the activity. In some other embodiments, the computing device 102 can be configured to trigger allowing of the activity by, for example, notifying other another device (or devices) to allow the activity. Also, it should be understood that the computing device 102 can determine that other actions should be performed in operation 220 (or other operations not illustrated in FIG. 2) such as, for example, suspending or aborting an alarm, an alert, a notification, or the like. Thus, flow of the method 200 to operation 220 can result in blocking alarms, alerts, notifications, or the like; triggering allowing of activity, and the like. It should be understood that this example is illustrative, and therefore should not be construed as being limiting in any way.

From operation 218, the method 200 can proceed to operation 222. The method 200 also can proceed to operation 222 from operation 220. The method 200 can end at operation 222.

Figure 3:
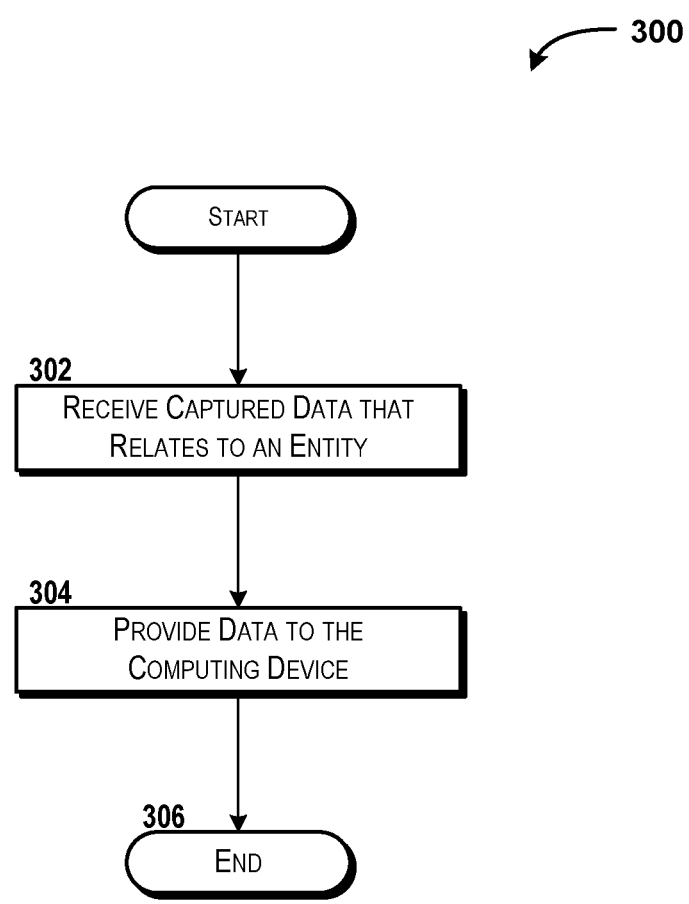
FIG. 3 is a flow diagram showing aspects of a method for providing trust data, according to an illustrative embodiment of the concepts and technologies described herein.

Turning now to FIG. 3, aspects of a method 300 for providing trust data will be described in detail, according to an illustrative embodiment. For purposes of illustrating and describing the concepts of the present disclosure, the method 300 is described herein as being performed by the server computer 126 via execution of one or more software modules such as, for example, the access management service 124. It should be understood that additional and/or alternative devices and/or network nodes can provide the functionality described herein via execution of one or more modules, applications, and/or other software including, but not limited to, the access management service 124. For example, the identity source 120 or the trust data source 136 can perform some or all of the operations illustrated and described herein with respect to FIG. 3, or similar or alternative operations as illustrated and described herein, via execution of one or more modules or applications. Thus, the illustrated embodiments are illustrative, and should not be viewed as being limiting in any way.

The method 300 begins at operation 302. At operation 302, the server computer 126 can receive captured data (e.g., the captured data 118) that relates to an entity such as the entity 114. For example, the server computer 126 can receive the captured data 118 and/or a portion thereof, which can relate to the entity 114. As explained above, the captured data 118 received in operation 302 can include one or more of, for example, image data, identity data 122, sensor data, activity data, entity data, and/or other information or data such as video data, audio data, biometric data, data communications data, device identifiers, user identifiers, combinations thereof, or the like.

As explained above, the server computer 126 can be configured to receive the captured data 118 and/or a portion thereof, and to provide data of different types in response to receiving the captured data 118 and/or the portion thereof. Also, as noted above, the functionality of the server computer 126 illustrated and described herein with respect to operation 302 can be provided by the identity source 120, the trust data source 136, or other devices, as will be explained in more detail below with reference to operation 304.

From operation 302, the method 300 can proceed to operation 304. At operation 304, the server computer 126 can provide data to the computing device that provided captured data 118 received in operation 302. Thus, for example, the server computer 126 can provide data to the computing device 102 as shown in FIG. 1. As explained in detail below, the server computer 126 (or other device that provides the functionality illustrated and described herein with reference to FIG. 3) can provide various types of data to the computing device 102 based on the type of information received in operation 302. Some examples are described below and/or illustrated and described elsewhere herein. It should be understood that these examples are illustrative, and therefore should not be construed as being limiting in any way.

If the captured data 118 received in operation 302 corresponds to image data or entity data, it can be appreciated that the server computer 126 or the identity source 120 can perform the operations illustrated and described herein with reference to FIG. 3 to determine or provide identity data 122 to the computing device 102. Thus, in operation 304 the server computer 126 or the identity source 120 can provide identity data such as the identity data 122 shown in FIG. 1 to the computing device 102. It can be appreciated that the server computer 126 or the identity source 120 can identify, based on the image data, an identity of an entity represented in the image data. It should be understood that this example is illustrative, and therefore should not be construed as being limiting in any way.

If the captured data 118 received in operation 302 corresponds to identity data or entity data, it can be appreciated that the server computer 126 or the trust data source 136 can perform the operations illustrated and described herein with reference to FIG. 3 to determine or provide one or more trust indicators 134 associated with the identity represented by the identity data 122. Thus, in operation 304 the server computer 126 or the trust data source 136 can provide one or more trust indicators such as the trust indicators 134 shown in FIG. 1 to the computing device 102. It can be appreciated that the server computer 126 or the trust data source 136 can identify the entity 114, based on the identity data 122. It should be understood that this example is illustrative, and therefore should not be construed as being limiting in any way.

If the captured data 118 received in operation 302 corresponds to sensor data, image data, or other data such as video, audio, or the like, it can be appreciated that the server computer 126 can perform the operations illustrated and described herein with reference to FIG. 3 to determine an activity associated with the entity 114 as discussed above with reference to FIG. 2. Thus, in operation 304 the server computer 126 can determine an activity based on movements, sounds, communications, and/or other considerations to the computing device 102. It can be appreciated that the server computer 126 can determine the activity based on various types of information such as, for example, the library 128 as described above with reference to FIG. 1. It should be understood that this example is illustrative, and therefore should not be construed as being limiting in any way.

From operation 304, the method 300 can proceed to operation 306. The method 300 can end at operation 306.

Figure 4:
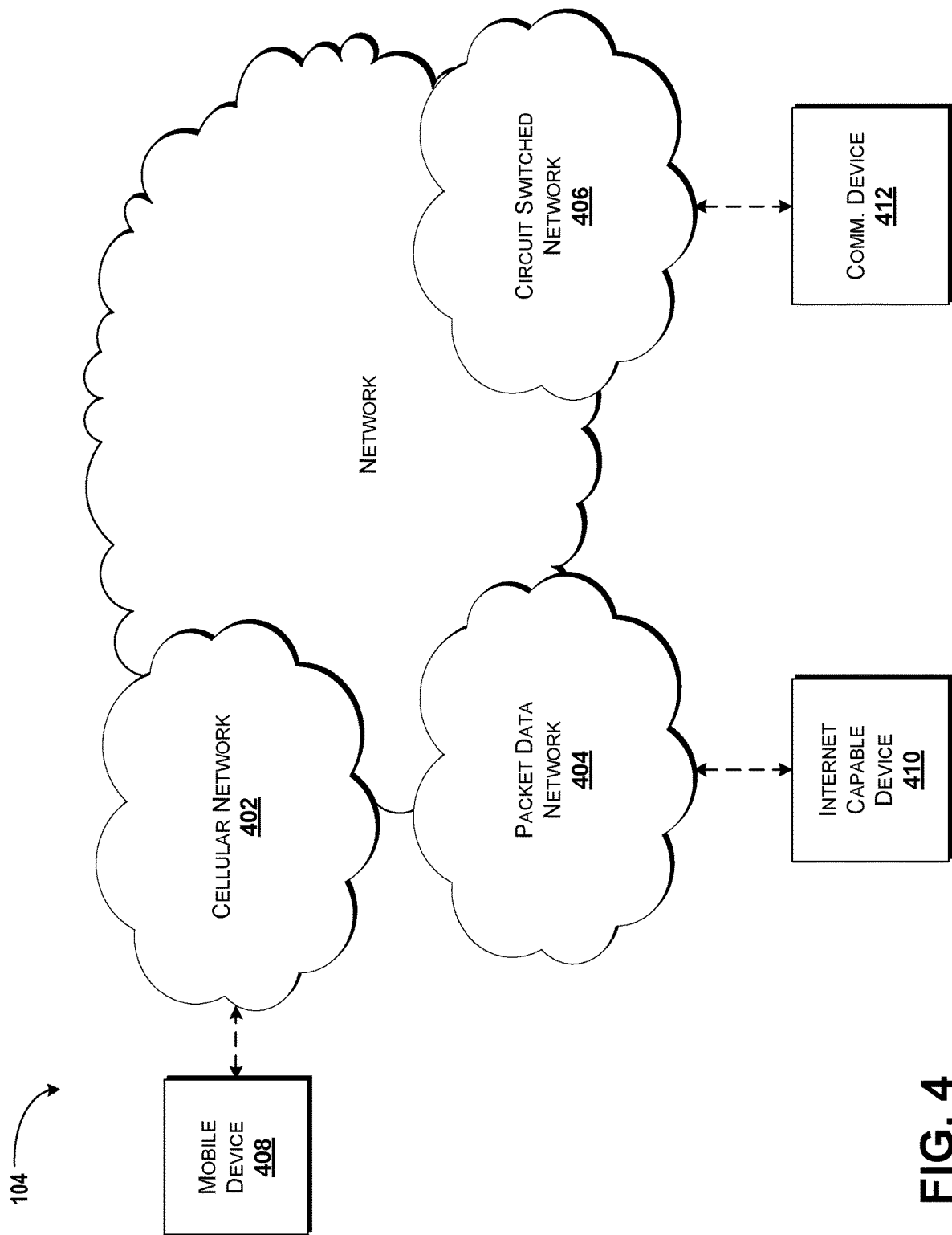
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
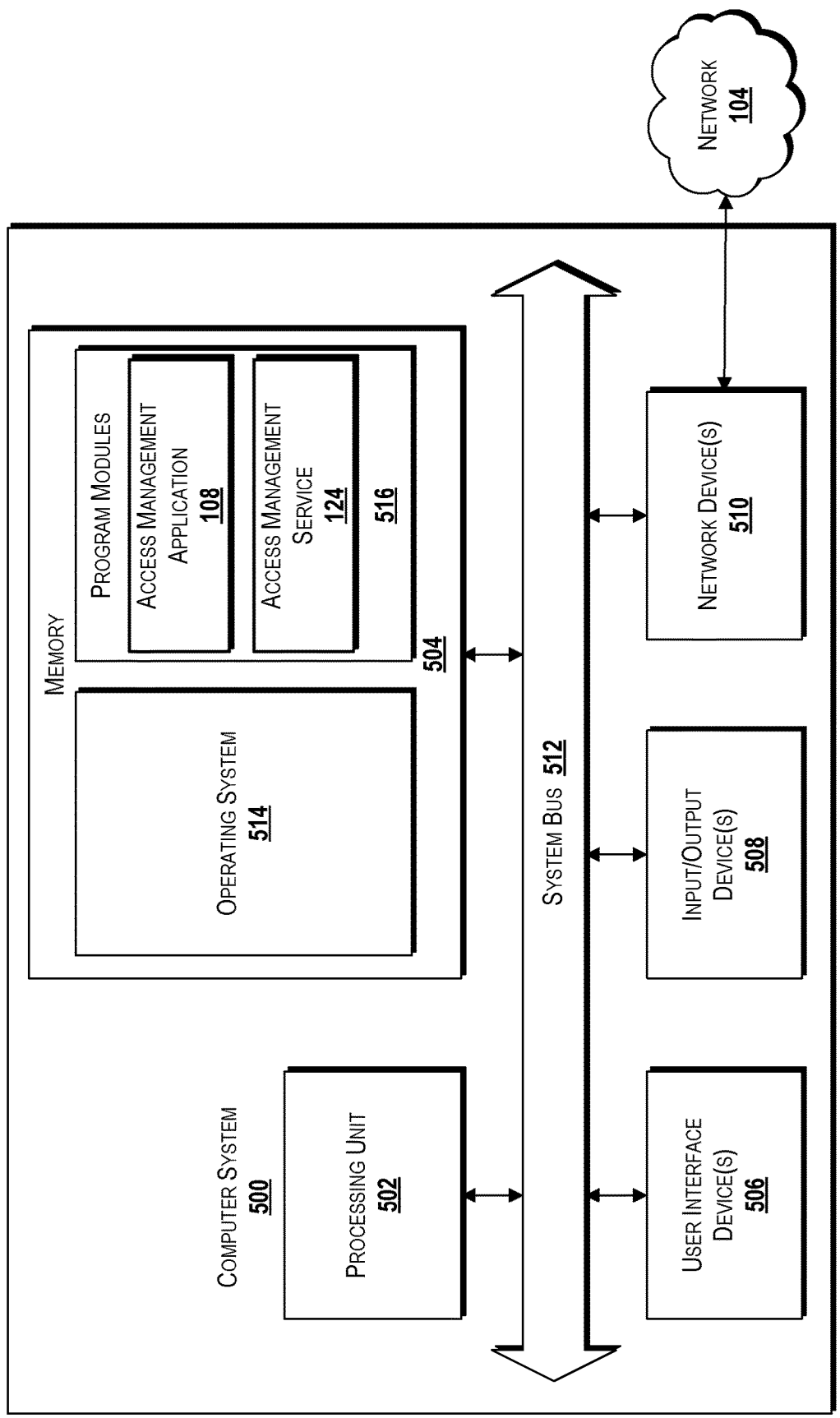
FIG. 5 is a block diagram illustrating an example computer system configured to manage resource access based on activities of entities, according to some illustrative embodiments of the concepts and technologies described herein.

FIG. 5 is a block diagram illustrating a computer system 500 configured to provide the functionality described herein for managing access based on activities of entities, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the access management application 108 and/or the access management service 124. These and/or other programs can be embodied in computer-readable media containing instructions that, when executed by the processing unit 502, perform one or more of the methods 200 and 300 described in detail above with respect to FIGS. 2-3 and/or other functionality as illustrated and described herein. It can be appreciated that, at least by virtue of the instructions embodying the methods 200 and 300, and/or other functionality illustrated and described herein being stored in the memory 504 and/or accessed and/or executed by the processing unit 502, the computer system 500 is a special-purpose computing system that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store the captured data 118, the identity data 122, the library 128, the trust data 132, the trust indicators 134, the trust score 138, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
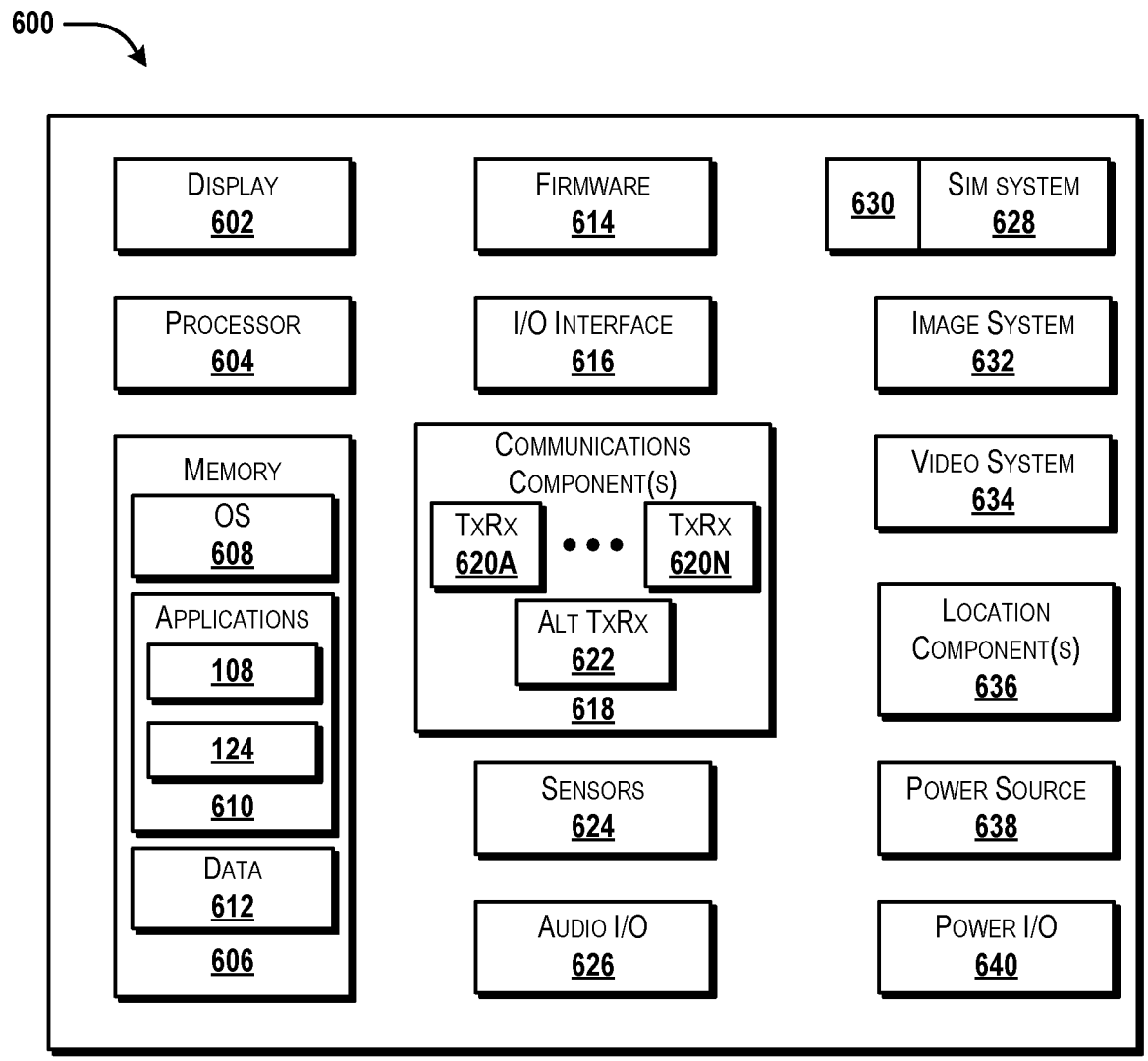
FIG. 6 is a block diagram illustrating an example mobile device configured to interact with an access management service, according to some illustrative embodiments of the concepts and technologies described herein.

Turning now to FIG. 6, an illustrative mobile device 600 and components thereof will be described. In some embodiments, the computing device 102 described above with reference to FIGS. 1-5 can have an architecture similar or identical to the mobile device 600 described herein in FIG. 6. It should be understood, however, that the computing device 102 may or may not include the functionality described herein with reference to FIG. 6. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610 such as the access management application 108, the access management service 124, other computer-executable instructions stored in a memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. The data 612 can include, for example, the access management application 108, the access management service 124, and/or other applications or program modules. According to various embodiments, the data 612 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604.

It can be appreciated that, at least by virtue of storage of the instructions corresponding to the applications 610 and/or other instructions embodying other functionality illustrated and described herein in the memory 606, and/or by virtue of the instructions corresponding to the applications 610 and/or other instructions embodying other functionality illustrated and described herein being accessed and/or executed by the processor 604, the mobile device 600 is a special-purpose mobile device that can facilitate providing the functionality illustrated and described herein. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, captured data 118, identity data 122, the library 28, the trust data 132, the trust indicators 134, the trust score 138, user information, organization information, presence status information, user IDs, passwords, and application initiation (start-up) requests. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as the network 104 described herein. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMAONE, CDMA2000, LTE, and various other 2G, 2.5G, 3G, 4G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSDPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. It can be appreciated that in various embodiments, the sensors 624 can include the sensors 116 illustrated and described herein. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, CCDs, combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Based on the foregoing, it should be appreciated that systems and methods for managing access based on activities of entities have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A device comprising:
a sensor comprising an audio device;
an imaging device;
a networking interface;
a processor; and
a memory that stores computer-executable instructions that, when executed by the processor, cause the processor to perform operations comprising:
 capturing, using the sensor and the imaging device, captured data that relates to an entity that is located in an environment comprising a proximity of the sensor and the imaging device, wherein the captured data comprises images of the entity and output from the sensor, wherein the images are captured by the imaging device, and wherein the captured data further comprises output from the audio device,
 determining, based on one image of the images, an identity of the entity,
 determining, based on the images, a movement of the entity,
 determining, based on the movement and based on the output from the audio device, an activity of the entity,
 obtaining, using the identity and via the networking interface, a trust indicator that is defined for the activity and for the entity, wherein the trust indicator comprises a trust value and an entity identifier, and wherein the trust value is defined for the entity and for the activity,
 determining, based on the trust indicator, if the activity of the entity should be allowed,
 if a determination is made that the activity of the entity should be allowed, initiating allowing of the activity, and if a determination is made that the activity of the entity should not be allowed, initiating blocking of the activity.

2. The device of claim 1, wherein the sensor further comprises a location device, wherein the captured data further comprises location data, and wherein the location data is used to obtain the trust indicator.

3. The device of claim 1, wherein the sensor further comprises a presence sensor, wherein the output from the sensor further comprises presence data, and wherein the presence data is used to obtain the trust indicator.

4. The device of claim 1, wherein the device is a connected home gateway device.

5. The device of claim 1, wherein the computer-executable instructions, when executed by the processor, cause the processor to perform operations further comprising:
   executing a background process to track additional movements of the entity;
   detecting, during the executing of the background process and based on the additional movements of the entity, a further activity associated with the entity; and
   determining, based on a further trust value of a further trust indicator, if the further activity is to be allowed.

6. The device of claim 1, wherein identifying the entity comprises:
   sending, directed to an identity source and via the networking interface, the one image of the images; and
   receiving, from the identity source, identity data that indicates the identity.

7. The device of claim 1, wherein determining the activity comprises:
   sending, directed to a server computer, the images; and
   receiving, from the server computer, activity data that indicates the activity.

8. The device of claim 1, wherein the trust value is defined for a geographic location.

9. The device of claim 1, wherein the computer-executable instructions, when executed by the processor, cause the processor to perform operations further comprising:
   generating, based on a plurality of trust indicators comprising the trust indicator, a trust score for the entity, wherein the trust score defines a trustworthiness of the entity, and wherein the trust score is applied to activities of the entity.

10. The device of claim 1, wherein determining the activity comprises:
    accessing information that defines types of movements that correspond to activities comprising the activity; and
    determining the activity based on the movements and the information.

11. The device of claim 1, wherein the activity comprises accessing an asset that is located in the environment, and wherein initiating blocking of the activity comprises triggering an alarm.

12. A method comprising:
    capturing, at a computing device comprising a sensor, an imaging device, and a networking interface, captured data that relates to an entity that is located in an environment comprising a proximity of the sensor and the imaging device, wherein the sensor comprises an audio device, wherein the captured data is captured using the sensor and the imaging device and comprises images of the entity and output from the sensor, wherein the images are captured by the imaging device, and wherein the captured data further comprises output from the audio device;
    determining, by the computing device and based on one image of the images, an identity of the entity;
    determining, based on the images, a movement of the entity;
    determining, based on the movement and based on the output from the audio device, an activity of the entity;
    obtaining, by the computing device via the networking interface and using the identity, a trust indicator that is defined for the activity and for the entity, wherein the trust indicator comprises a trust value and an entity identifier, and wherein the trust value is defined for the entity and for the activity;
    determining, by the computing device and based on the trust indicator, if the activity of the entity should be allowed;
    if a determination is made that the activity of the entity should be allowed, initiating, by the computing device, allowing of the activity; and
    if a determination is made that the activity of the entity should not be allowed, initiating, by the computing device, blocking of the activity.

13. The method of claim 12, further comprising:
    generating, based on a plurality of trust indicators comprising the trust indicator, a trust score for the entity, wherein the trust score defines a trustworthiness of the entity, and wherein the trust score is applied to activities of the entity.

14. The method of claim 12, wherein identifying the entity comprises:
    sending, directed to an identity source, the one image of the images; and
    receiving, from the identity source, identity data that indicates the identity.

15. The method of claim 12, wherein determining the activity comprises:
    accessing information that defines types of movements that correspond to activities comprising the activity; and
    determining the activity based on the movement and the information.

16. The method of claim 12, wherein the trust value is defined for a particular geographic location.

17. A computer storage medium having computer-executable instructions stored thereon that, when executed by a processor, cause the processor to perform operations comprising:
    capturing, at a computing device comprising a sensor, an imaging device, and a networking interface, captured data that relates to an entity that is located in an environment comprising a proximity of the sensor and the imaging device, wherein the sensor comprises an audio device, wherein the captured data is captured using the sensor and the imaging device and comprises images of the entity and output from the sensor, wherein the images are captured by the imaging device, and wherein the captured data further comprises output from the audio device;
    determining, based on one image of the images, an identity of the entity;
    determining, based on the images, a movement of the entity;
    determining, based on the movement and based on the output from the audio device, an activity of the entity;
    obtaining, via the networking interface and using the identity, a trust indicator that is defined for the activity and for the entity, wherein the trust indicator comprises a trust value and an entity identifier, and wherein the trust value is defined for the entity and for the activity;

determining, based on the trust indicator, if the activity of the entity should be allowed;

if a determination is made that the activity of the entity should be allowed, initiating allowing of the activity; and if a determination is made that the activity of the entity should not be allowed, initiating blocking of the activity.

18. The computer storage medium of claim 17, wherein identifying the entity comprises:

sending, directed to an identity source, the one image of the images; and receiving, from the identity source, identity data that indicates the identity.

19. The computer storage medium of claim 17, wherein determining the activity comprises:

accessing information that defines types of movements that correspond to activities comprising the activity; and determining the activity based on the movement and the information.

20. The computer storage medium of claim 17, wherein the trust value is defined for a particular geographic location.

* * * * *